Oct. 1, 1929.   F. S. SHIELDS   1,729,969
TILLAGE IMPLEMENT
Filed April 1, 1925   6 Sheets-Sheet 4

Patented Oct. 1, 1929

1,729,969

UNITED STATES PATENT OFFICE

FRANK S. SHIELDS, OF NEW YORK, N. Y., ASSIGNOR TO THE UNIVERSAL TILLER CORPORATION, OF NEW YORK, N. Y., A CORPORATION OF DELAWARE

TILLAGE IMPLEMENT

Application filed April 1, 1925. Serial No. 19,753.

This invention relates generally to a combined plow and soil disintegrating implement with particular reference to a hitch or coupling mechanism for operatively connecting the implement to a tractor.

This invention has for one of its principal objects the provision of a tractor hitch for plows which will provide a combined plow and soil disintegrating implement which will function to simultaneously turn and thoroughly disintegrate a furrow slice.

The invention has other objects in view which will hereinafter appear in the general description of the invention.

The invention includes a soil disintegrating device or tiller consisting of a vertical shaft equipped with blades and removably mounted at its upper end in an oil-containing housing, the depending shaft occupying a position in which the blades engage and pulverize the furrow slice being turned by the plow. The tiller supporting housing is pivotally mounted in trunnions on the plow beam so that the tiller shaft may swing outwardly to permit a stone or the like to pass, a spring being arranged to restore the tiller to its normal operating position.

A feature of the invention includes a drive shaft connection between a power-take-off device on the side of the tractor and a drive connection in the housing for the tiller shaft. The drive shaft connection includes a clutch device operated from the hand lever referred to so that a single lever lifts and lowers the plow, levels the plow in its operating position, and automatically clutches and unclutches the tiller in accordance with the lowered and operative or with the raised and inoperative position of the plow.

Other features of the invention will be hereinafter referred to.

In the drawings, in which a preferred embodiment of the invention has been selected for illustration.

Referring to the drawings for a more detailed description of the invention, a plow 10, on which is mounted a soil disintegrator or tiller 9, is coupled at its forward end to the draw-bar of a tractor 12.

Figure 1:
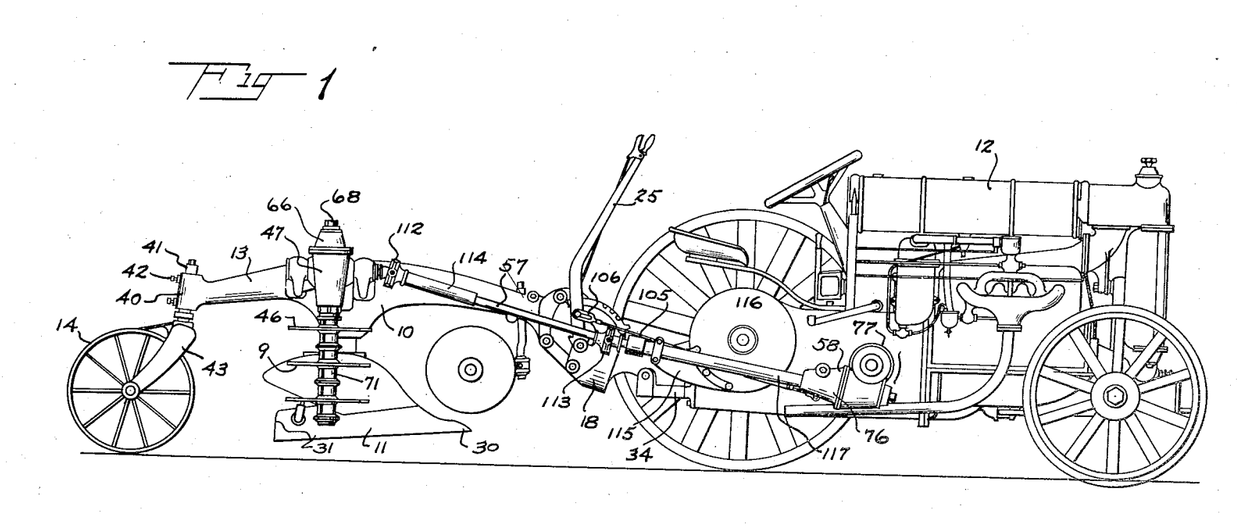
Figure 1 is a view in side elevation of a tillage implement embodying the invention and showing the implement coupled to a tractor.

The plow 10 embodies a simple construction and, when in a raised position as in Figure 1, is supported only at the rearmost extremity of the beam 13 by a trailer wheel 14, and at the forward end of the beam by coupling mechanism directly connected to the draw-bar head of the tractor.

The coupling mechanism includes a bracket or draft member 15 having a hinged or pivoted relation with the tractor draw-bar head to permit of vertical swinging of the draft member in the raising or lowering of the connected plow beam.

Figures 2, 9:
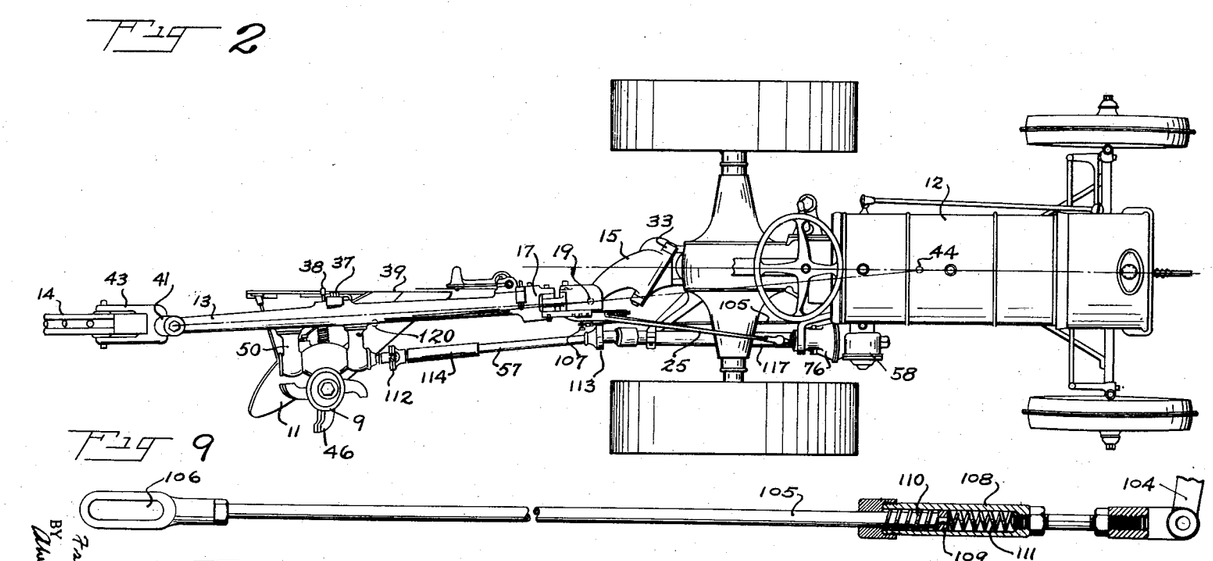
Figure 2 is a plan view of the devices shown in Figure 1.
Figure 9 is a sectional view showing in detail a clutch operating rod forming part of the invention.
Figure 3:
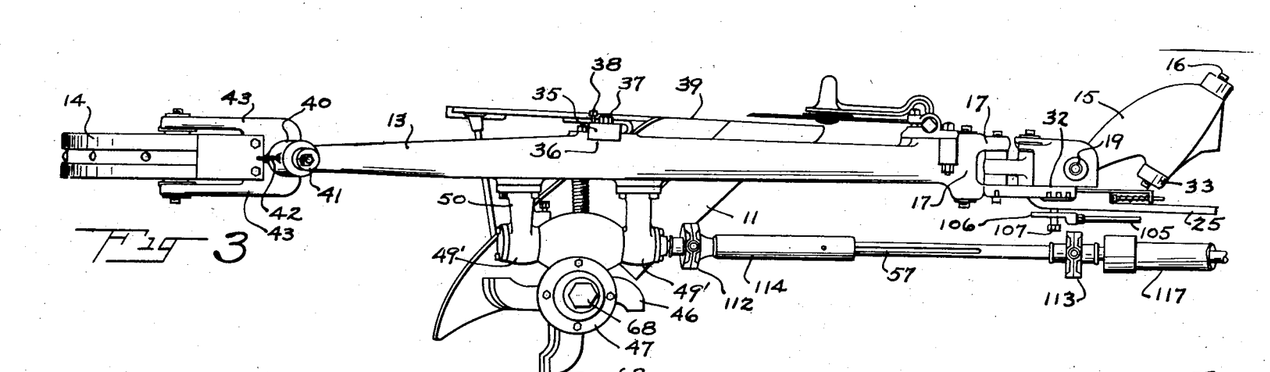
Figure 3 is a view on an enlarged scale showing the tillage implement in plan and in operating position.

In order to maintain the plow in a level position with relation to the surface of the ground and relieve it from the lateral tilting of the tractor due to travel of the wheels on one side of the tractor in the furrow, the pivotal axis of the draft member is arranged at an angle between the longitudinal and the transverse axes of the tractor as is shown at 16 in Figures 2 and 3 of the drawing. This oblique or diagonal disposition of the pivotal axis of the draft member brings about a relative canting or tilting of the plow with relation to the tractor which is designed to exactly compensate for the lateral tilting of the tractor so that the net result is that the plow is maintained in a level condition with respect to the surface of the ground. While the particular angle between the transverse and longitudinal axes of the draw-bar head may be varied somewhat within the scope of the invention, I have found that an angle of thirty-five degrees between the transverse axis of the draw-bar head and the axis of the hinge or pivot is satisfactory in practical operation.

The connection between the draft member 15 and the forward end 17 of the plow beam 13 includes a head or coupling member 18 mounted to swing horizontally on a vertical pivot 19 formed by the rearward extremity of the draft member 15. The vertical pivotal axis 19 formed by the rearward extremity of the draft member 15 is disposed to one side of the longitudinal axis of the draw-bar head and in the line of draft between the longitudinal and transverse center of the tractor as a whole and the center of draft of the plow bottom.

The head or coupling member 18 carries a pivotally mounted crank arm or link 20 mounted on a pivot 21 carried by the head 18. At the other end the arm 20 is pivotally connected to a shaft 22 mounted in a pair of ears or lugs 23 formed on the forward extremity of the forward end 17 of the beam 13. The arm 20 is provided with a toothed sector portion 23′ which is engaged by a correspondingly toothed sector 24 formed on a hand lever 25 pivotally mounted at 26 on the head 18. In addition to the arm 20 a link 27 is provided to complete the operating connection between the head 18 and the forward end 17 of the plow beam. A link 27 is pivoted at 28 to the head 18 and at 29 to the lower forward extremity of the head 17 of the beam.

Figure 4:
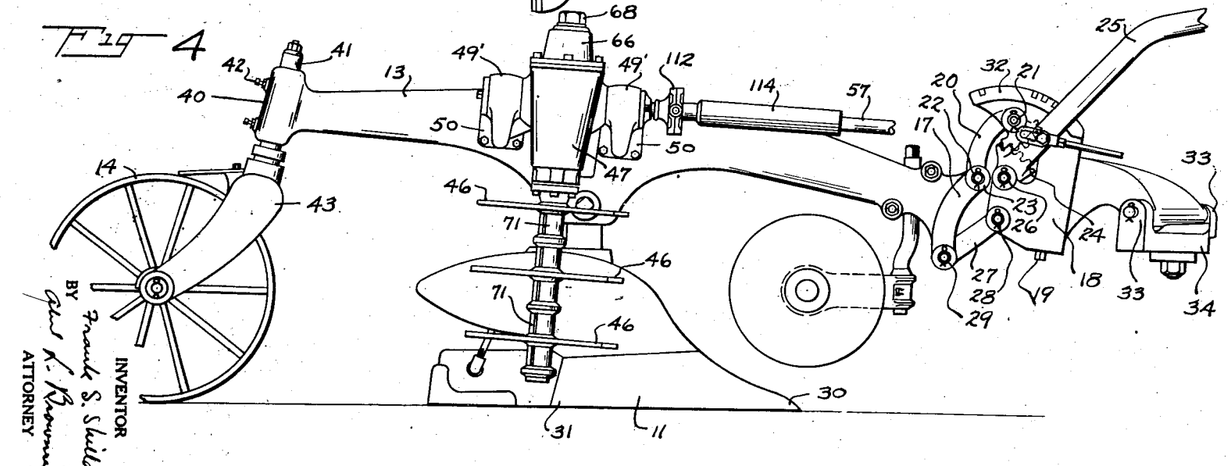
Figure 4 is a view in side elevation of the parts shown in Figure 3.
Figure 5:
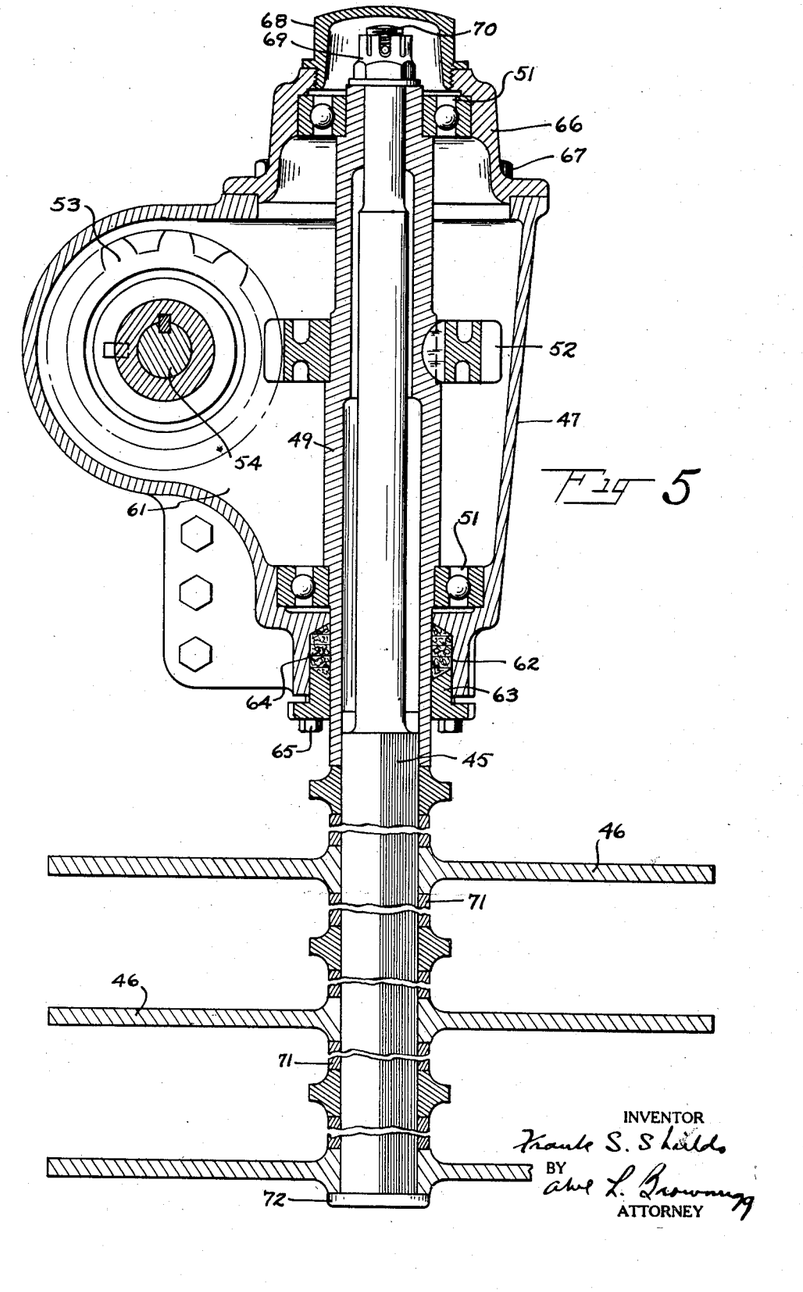
Figure 5 is a view in vertical section and on an enlarged scale of a tiller device forming part of the invention.
Figure 6:
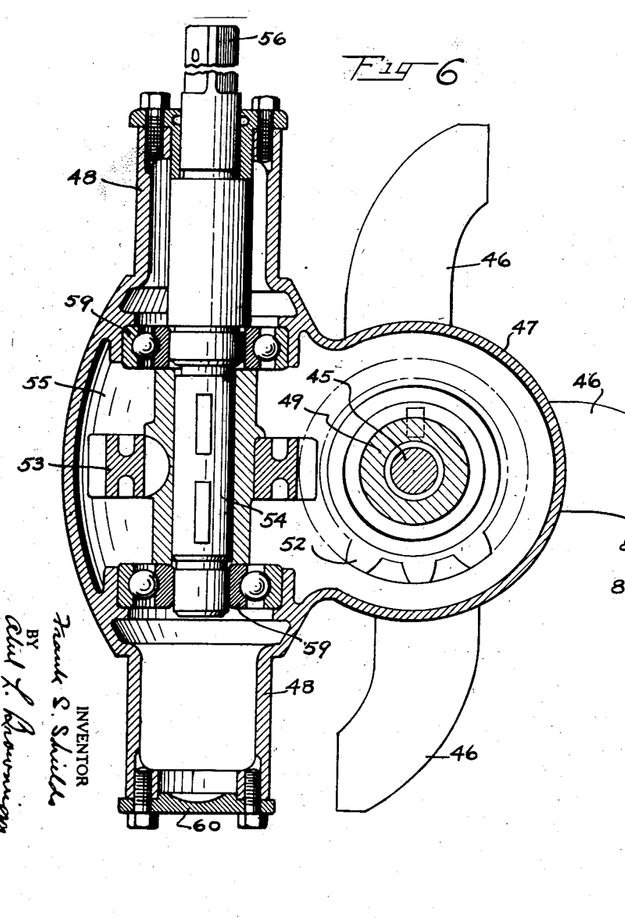
Figure 6 is a view in horizontal section of the device shown in Figure 5.

With this construction and arrangement of parts it will be seen that the forward end of the plow beam can be raised or lowered by the rearward or forward movement of the hand lever 25 which operates to swing the crank arm 20 about its pivot 21 to thereby raise or lower the forward end of the plow beam. A lowered position of the plow parts is shown in Figure 4 of the drawing whereas a raised position is shown in Figure 1. It will be seen that the crank arm 20 and the link 27 are so connected to the head 18 and the forward end 17 of the plow beam as to provide what is in effect a parallel motion device, the pivotal mounting of the draft member 15 providing for the necessary raising or lowering movement of the draft member to provide for the desired elevation or depression of the plow beam and connected parts.

An important feature of the invention resides in the relative disposition of the points of connection 22 and 29 of the arm 20 and the link 27 to the forward end of the plow beam. It will be seen that the upper connecting point 22 is placed at a point substantially forward of the vertical line passing through the lower connecting point 29 as is clearly shown in Figure 4 of the drawings. This forwardly disposed position of the upper connecting point 22 has the effect of providing and maintaining a level disposition of the plow with relation to its longitudinal axis in all conditions of operation. This is achieved or brought about by the rigid maintenance of the plow in a position such that pressure is constantly exerted downwardly through the trailer wheel 14 with a corresponding holding of the point 30 of the plow bottom 11 in a position level with the rearward portion or heel 31 of the plow. In other words forward tilting of the plow 11 on the point 30, which commonly occurs with plow hitch constructions heretofore known and used in hard or refractory ground, is avoided and the proper level operating condition of the plow is maintained. It has also been found that a smaller consumption of power is necessary when the plow is held in a level position.

The hand lever 25 cooperates with a toothed segment 32 carried by the head 18 so that the hand lever can be locked in various positions to correspondingly hold the plow to operate at different levels, as will be clear. It will also be seen that the connection that is provided between the tractor draw-bar head and the plow beam is wholly rigid and inflexible so far as upward or downward motion between the draft member 15 and the plow beam 13 is concerned, the plow parts, however, being free to swing laterally to a limited extent about the vertical pivot 19 in order that the plow will adjust itself to the draft conditions and take its natural path of travel.

The draft member 15 has a bracket shaped formation, as will be seen, and has a vertical disposition at its rearward end and a horizontal disposition at its forward end where it is hinged on the diagonal axis 16 between ears or lugs 33 formed on a plate 34 adapted to be bolted directly to the draw-bar head of the tractor. The bolted connection thus used provides for the ready detachment of the plow from the tractor when it is desired to use the tractor for other purposes.

Another feature of the invention resides in means that are provided for adjusting the relative position of the plow bottom 11 with the beam 13 in order to thereby vary the width of the furrow cut by the plow. This adjusting means resides in the varying of the angular disposition of the standard or post 35 of the plow in its seat 36 in the side of the plow beam 13. A bolt and nut connection 37 holds the standard 35 in its seat while a set screw 38 serves to vary the angular position of the standard 35 in the seat 36. In this way the angle of the landside 39 of the plow can be changed as desired with relation to the longitudinal axis of the beam thereby causing the plow to cut furrow slices of different width. This arrangement provides also for the interchange of plows so that plows of substantially different widths of cut may be interchanged and used with the same plow beam.

The rearward extremity of the plow beam 13 forms an inclined bracket member 40 in which a sleeve 41 is held by means of the set screws 42. The shaft of a trailer or caster-wheel fork 43 is journaled in the sleeve 41 for rotation therein as the trailer wheel swings about a vertical axis to follow the turns or angles made by the plow. The vertical position of the sleeve 41 in the bracket 40 may be varied to suit different conditions of the work, the sleeve being held in any desired position of adjustment by the set screws 42.

As has already been pointed out the disposition of the rearward end of the draft member 15 is such that the line of draft between the center point 44 of the tractor and the center of draft or resistance 41 of the plow, passes through the vertical pivotal point 19 of the draft member to which the plow as a whole is attached for transverse swinging movement. The head or connecting member 18 is so constructed as to limit the extent of swinging movement which can be partaken of by the plow beam so that the tractor with its connected plow can be freely moved rearwardly in the raised position of the plow shown in Figure 1 of the drawings for facilitating the backing of the plow into any desired position. In the back movement of the plow the trailer wheel 14 will swing to a position between the bracket member 40 and the plow bottom 11, the rearward extension of the beam 13 being sufficient to provide for this position of the trailer wheel. It will be seen that the inclined position of the trailer wheel bracket 40 is such that the disposition of the trailer wheel between the bracket 40 and the plow 11 produces a lifting or elevating effect on the heel portion of the plow, thereby insuring that the plow will clear obstructions in its rearward movement.

The construction described includes a soil disintegrator 9 which has already been referred to and which takes the form of a depending shaft 45 provided with soil-disintegrating blades 46 and supported only at its upper end in a head or housing 47. The head 47 is provided with forwardly and rearwardly extending lugs or shaft members 48 which are journaled in a pair of trunnions or bracket members 50 attached to the side of the plow beam 13. The head 47 provides a housing for a hollow shaft 49 which is journaled in ball bearings 51 at the lower and upper extremities of the head 47. The hollow shaft 49 has keyed thereto a helical gear 52 which has intermeshing engagement with a helical gear 53 mounted for rotation with a horizontal counter-shaft 54 journaled in an extension 55 on the housing 47 and extending through the forward extension 48 which is pivotally mounted in the forward trunnion 50. The counter-shaft 54 terminates in a squared end 56 to which a driving shaft 57 leading from a power-take-off device 58 on the tractor may be connected. The counter-shaft 54 is mounted in ball bearings 59 and the rearward hollow extension 48 of the housing 55 is provided with a removable cap member 60 to provide access to the interior of the housing extension.

In order to maintain a supply of liquid lubricant in the chamber 61 formed by the housing 47 in order to continuously lubricate the moving parts therein, the lower extremity of the housing 47 is formed into a stuffing-box structure 62 in which the gland or sleeve member 63 is forced against suitable packing material 64 through the manipulation of the screws 65. It will be seen that with the structure described a supply of lubricating oil may be retained in the housing 47 to continuously lubricate the gears and bearings operating therein.

The housing 47 is provided with a relatively permanent cap member 66 which is attached in place by means of the screws 67, the removal of the cap 66 providing complete access to the interior of the housing for any purpose. A supplemental or secondary cap member 68 is also provided which has a screw-threaded relation with an opening in the top of the main cap member 66. The removal of the secondary cap 68 provides access to a crown nut 69 cooperating with the upper end 70 of the tiller shaft 45 already referred to. It will be seen that the removal of the tiller shaft 45 from its seat in the housing is readily accomplished by the simple removal of the nut 69. It will also be seen that the removal of the shaft 45 from its seat within the hollow shaft 49 is accomplished without the disturbance of the operating mechanism contained within the housing and without removal or leakage of the supply of oil in the housing. It will thus be seen that the driving mechanism for the tiller device is arranged to run in oil and is thoroughly protected from dust and grit.

In order to insure rotation of the tiller shaft 45 with the hollow driving shaft 49 the main body portion of the tiller shaft 45 has a square or other non-circular formation in cross-section and the upper end of the squared section of the shaft is fitted into the lower and correspondingly shaped end of the hollow shaft 49.

The tiller shaft 45 is equipped with a series of blades 46 separated by sleeves or washers 71 and the shaft-receiving openings through the hub members of the blades 46 are formed to fit the squared section of the shaft 45. A head or flange 72 on the lower end of the tiller shaft 71 pulls the series of blades into position, the uppermost blade 46 being clamped against the lower end of the hollow shaft 49 by the action of the nut 69 already referred to.

By reference to Figure 4 of the drawing in which the plow is shown in its lowered or operating position, it will be seen that the tiller device partakes of a slightly forwardly inclined position, it having been found in practice that this position most satisfactorily cooperates with the mass of earth being turned by the plow and lessens the sharpness of the angle made by the universal joint 112. The rotation of the blades 46 which takes place in a counter-clockwise direction engages and thoroughly disintegrates the furrow slice throughout its depth so that the falling earth delivered from the rotating tiller settles in a thoroughly pulverized or disintegrated condition forming a seed-bed wholly free from lumps and in a finely divided condition.

In order to prevent jamming of the tiller device or breakage thereof by engagement of the blades with a stone or other obstruction turned up by the plow, the tiller device is adapted as a whole to swing outwardly through its pivotal mounting in the trunnions 49' so that a stone turned up by the plow may pass between the mold board and the depending tiller. In order to restore the tiller device to its normal position in operating relation to the plow, a spring 72 attached to the plow beam is connected at its other end to the lower part of the tiller shaft housing and exerts a pulling action on the tiller device. A stop screw 73 mounted in a projection on the rearward trunnion 49 serves to adjustably limit the normal position of the tiller shaft under the pull of the spring 72.

Figure 7:
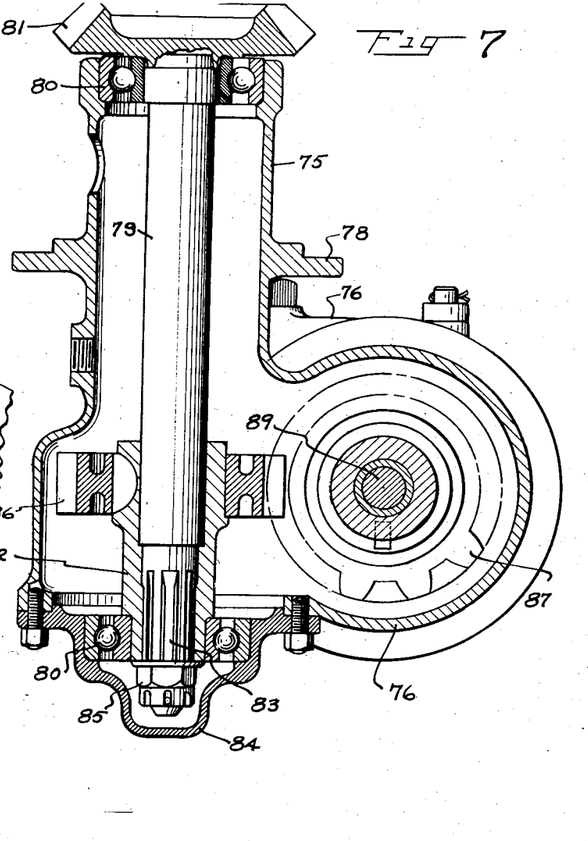
Figure 7 is a view in transverse vertical section of a power-take-off device forming part of the invention.

The power-take-off device 58 through which power is taken from the power plant in the tractor to rotate the tiller device is attached to the tractor transmission shaft in lieu of the pulley with which this transmission shaft is ordinarily equipped. Referring to Figure 7 of the drawings, an extension 75 on a power-take-off housing 76 is received in an opening in the transmission housing 77 of the tractor to the wall of which the power-take-off housing 76 is attached by means of bolts or screws passing through the flange 78. Within the housing 76 a shaft 79 is journaled in the ball bearings 80. One end of the shaft 79 has a bevel gear 81 integrally formed thereon, the gear being in mesh with the transmission shaft bevel gear of the tractor. The forward end of the shaft 79 is equipped with a sleeve 82 having a keyed connection 83 with the shaft. A cap member 84 supports the forward ball bearing 80 and the forward end of the shaft and provides access to a nut 85 holding the sleeve 82 in place.

The sleeve 82 on the drive shaft 79 has a helical gear 86 keyed in place thereon. The helical gear 86 meshes with a corresponding helical gear 87 keyed to rotate with a clutch member 88 journaled on a shaft 89 and supported in a ball bearing 90 within the housing 76. A cap 91 on the end of the housing provides access to the bearing and adjacent parts. A conical inside clutch member 92 has a feathered connection at 93 with the shaft 89 which provides for rotation of the shaft 89 when the clutch member 92 is rotated, the feathered construction providing for movement of the clutch member 92 longitudinally of the shaft into or out of frictional engagement with the interior face of the outer clutch member 88 already referred to.

In order to manipulate the inside clutch member 92 and thereby bring about the rotation of the shaft 89 when desired, a wedging member 94 is slidably mounted on the shaft 89 to be moved into or out of spreading relation to a pair of arms 95 pivoted at 96 on the inside clutch member 92. The arms 95 are provided with projecting fingers 97 which, in the spread relation of the outer ends of the arms 95, engage an annular abutment member 98 carried by the shaft 89 in immovable relation thereto. It will be seen that the forcing apart of the arms 95 under the action of the wedging member 98 has the effect of forcing the fingers 97 against the abutment member 98 and thereby exerting pressure against the pivotal points 96 and the inside clutch member 92 to bring about frictional engagement of the inner clutch member with the outer clutch member 88.

The wedging member 94 is provided with a groove 99 in which pins 100 carried by a forked arm 101 project so that when the arm 101 is turned about its pivotal support 102, the wedging member 94 is moved longitudinally of the shaft 89.

Figure 8:
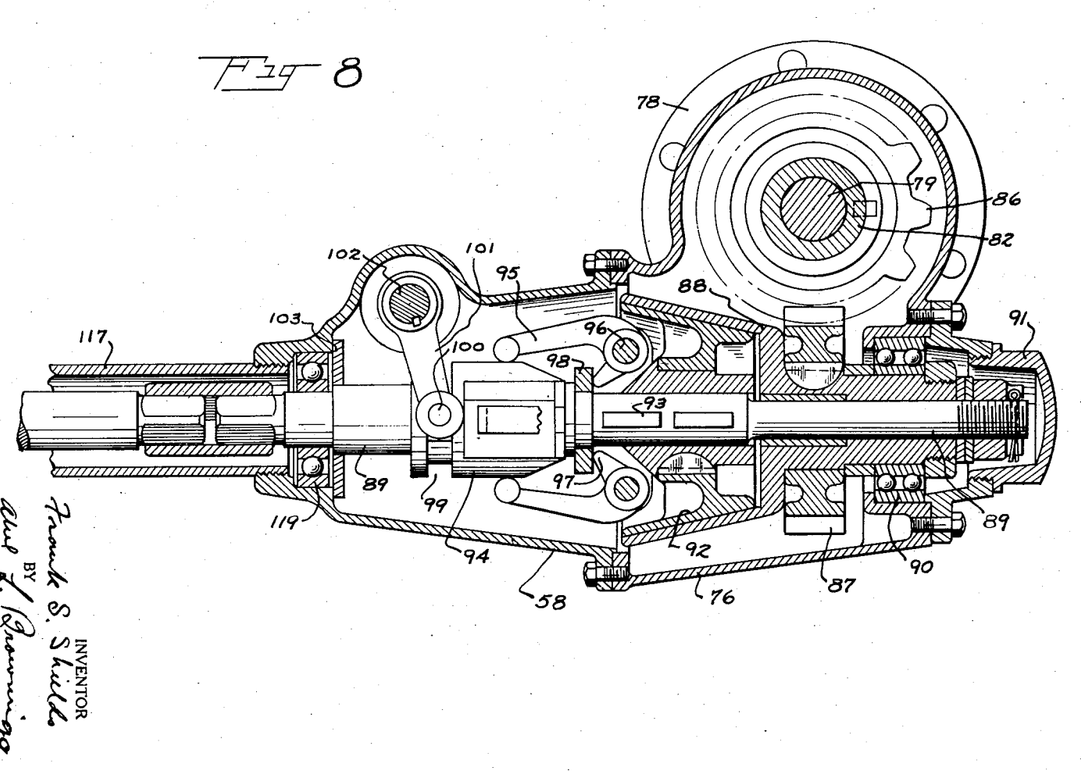
Figure 8 is a view in vertical longitudinal section of the power-take-off device shown in Figure 7.
Figure 10:
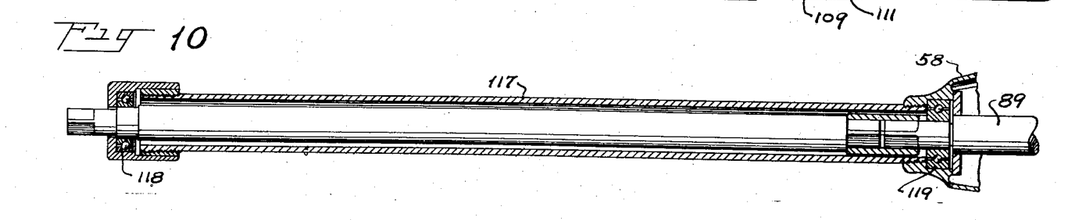
Figure 10 is a sectional view showing in detail a portion of a drive shaft and housing therefor forming part of the invention.

In the withdrawing movement of the wedging member 94 from its clutch engaging position shown in Figure 8 of the drawings, the arms 95 are permitted to move inwardly in accordance with the converging formation of the forward end of the member 94. In order to effect a positive withdrawal of the inside clutch member 92 a pair of arms 120 provided with inturned ends are projected from the inside clutch member along opposite surfaces of the wedging member 94. The forward end of the member 94 is provided with outstanding lugs 121 which engage the inturned extremities of the arms 120 when the wedging member has traveled through the greater part of its rearward movement. The engagement of the lugs 121 with the ends of the arms 120 operates to pull the inside clutch out of engagement with the outside clutch member and thereby disconnect the clutch parts. When the wedging member 94 has completed its rearward travel it engages a braking or friction member 103 which acts to check the rotation of the wedging member and also the shaft on which it is mounted so that upon the disengagement of the clutch parts the rotating shaft is quickly brought to rest.

The clutch operating arm 101 is actuated through an operating arm 104 connected through a rod 105 with the hand lever 25 which is used in the lifting and lowering of the plow. Thus it will be seen that when the hand lever 25 is moved forwardly to lower the plow to operating position the clutch parts are automatically engaged so that the tiller device is automatically connected for operation simultaneously with the lowering of the plow to operating position.

The rearward end of the clutch operating rod 105 is slotted as at 106 and a pin 107 projecting laterally from the hand lever 25 provides for a flexible connection of parts such as will prevent interference with the operation of the clutch in the different relative positions in which the tractor and the plow pulled thereby may be placed.

The clutch rod 105 contains a telescopic spring section shown in detail in Figure 8 of the drawings. The forward end of the clutch rod is connected to a cylindrical member 108 in which the rearward end of the rod 105 has longitudinally sliding movement. An abutment member 109 on the end of the rearward portion of the shaft 105 is used as a separating member for a pair of coil springs 110 and 111 which tend to hold the abutment member in a centrally disposed position within the cylinder 108 thereby providing a cushioning or shock absorbing function for operation of the clutch rod 105 in either direction.

The drive shaft 57 which provides a driving connection between the power-take-off mechanism 58 and the counter-shaft 54 in the tiller head or housing, is provided with two universal joint members 112 and 113 to provide for differences in angular relation between the plow and the tractor. In addition, to add to the flexibility of the connection, the drive shaft 57 has a telescopic relation at its forward end with a sleeve 114 so that the drive shaft 57 can move longitudinally with relation to the sleeve but has a feathered connection with the sleeve 105 in order to cause the sleeve to rotate therewith.

The forward section of the drive shaft 57 is supported at its rearward end on a bracket member 115 bolted to the differential housing 116 of the tractor. The forward section of the drive shaft 57 is also housed in a tubular or cylindrical casing 117 which is directly connected at its forward end with the housing 76 of the power-take-off device. Suitable ball bearings 118 and 119 are used to reduce the friction of rotation of the shaft within the housing 117.

It will be seen that the described construction provides a tillage implement to which a tractor can be removably attached to not only draw the implement across the field but which will at the same time supply power for operation of the rotatable soil disintegrator or tiller. The hitch or coupling construction, as has been pointed out, provides a close hitch which causes a large proportion of the downward pull of the plow to be applied to the tractor wheels and automatically maintains a level operating position of the plow regardless of lateral tilting of the tractor. The soil disintegrator or tiller is removable so that the plow may be used as a separate unit with the advantageous control afforded by the improved hitch structure. When the soil disintegrator is used it co-operates with the plow to provide in one operation a thoroughly pulverized seed-bed ready for the reception of the seed without a further soil-working operation of any character. The implement not only produces a higher quality of seed-bed than is ordinarily produced, but it prepares a seed-bed at a greatly lessened cost in time and labor over prior methods of operation.

What I claim is:—

1. The combination with a power propelled vehicle, of a plow connected therewith, a vertically adjustable wheel supported plow, means for raising and lowering the plow, a rotatable tiller carried by the plow, a driving connection between the tractor and the tiller for rotating the tiller, and means connected to the plow raising and lowering means for controlling said driving connection.

2. The combination with a power propelled vehicle, of a plow connected therewith, a vertically adjustable wheel supported plow, a hand lever mounted on said connecting means for raising and lowering the plow, a rotatable tiller carried by the plow, a rotatable shaft connection between the tractor and the tiller for rotating the tiller, a clutch for said rotatable shaft connection, and means connected to the plow raising and lowering means for operating the clutch to connect or disconnect the driving means for the tiller when the plow is lowered or raised respectively.

3. The combination with a power propelled vehicle, of a plow connected therewith, a vertically adjustable wheel supported plow, a rotatable tiller, bracket means on the plow beam for supporting the tiller in a depending position to engage the soil being turned by the plow, said tiller having a hinged connection with the bracket whereby to swing outwardly from the plow, spring means for normally holding the tiller in operating position adjacent the plow, a power-take-off device on the tractor, and a drive shaft connection between the power-take-off device and the rotatable tiller.

4. The combination with a power propelled vehicle, of a plow connected therewith, a vertically adjustable wheel supported plow, a rotatable tiller, a pair of bracket members on the furrow side of the plow beam, a driving head for the rotatable tiller mounted in said bracket members, said tiller consisting of a blade-equipped shaft inclined slightly to the vertical and depending from said driving head in position to engage the soil being turned by the plow, a power-take-off device on the furrow side of the tractor, a drive-shaft connection between the power-take-off device and the tiller driving head, a clutch device in said connection, and means for automatically operating the clutch to rotate the drive shaft when the plow is lowered to operating position.

5. In a soil disintegrating device adapted to be attached to a plow, a housing supported on the plow beam, a hollow vertical shaft journaled in said housing, a stuffing box between the lower end of the housing and the hollow shaft whereby the housing may contain a supply of liquid lubricant, a tiller shaft removably mounted at its upper end in said hollow shaft, and said tiller shaft being equipped with blades arranged to engage and disintegrate the soil being turned by the plow.

6. In a soil disintegrating device adapted to be attached to a tractor-pulled plow, a pair of spaced apart bracket members mounted on the furrow side of the plow beam, a housing having a vertically extending portion and a horizontally extending portion, said horizontally extending portion being pivotally supported in said bracket members, a drive shaft member journaled in said horizontal portion of the housing, a hollow shaft journaled in the vertically extending portion of the housing, intermeshing helical gears mounted on said shafts, a tiller shaft mounted at its upper end in said hollow shaft to rotate therewith, and a driving connection between the tractor and the drive shaft in said housing.

7. In a soil disintegrating device adapted to be attached to a tractor-pulled plow, a pair of spaced apart bracket members mounted on the furrow side of the plow beam, a housing having a vertically extending portion and a horizontally extending portion, said horizontally extending portion being pivotally supported in said bracket members, a drive shaft journaled in said horizontal portion of the housing, a hollow shaft journaled in the vertical portion of the housing, ball bearings for said shafts, intermeshing helical gears on said shafts, a stuffing-box connection between the lower end of the housing and said hollow shaft whereby the housing may contain a supply of liquid lubricant, a tiller shaft having a non-circular cross-section, radially extending blades removably mounted on the tiller shaft to rotate therewith, said tiller shaft being removably mounted at one end in the hollow shaft in said housing whereby the tiller will extend downward to engage the soil being turned by the plow, and a driving connection between the tractor and the drive shaft journaled in said housing.

Signed at New York, in the county and State of New York, this 17th day of March, 1925.

FRANK S. SHIELDS.